Feb. 6, 1951   S. E. WINDER   2,540,154
SYNCHRONIZER FOR MACHINES SUCH AS GLASS MACHINES
Filed March 12, 1947   5 Sheets-Sheet 1

Patented Feb. 6, 1951

2,540,154

UNITED STATES PATENT OFFICE 2,540,154

SYNCHRONIZER FOR MACHINES SUCH AS GLASS MACHINES

Samuel E. Winder, Washington, Pa., assignor of one-half to Henry C. Daubenspeck, Massillon, Ohio Application March 12, 1947, Serial No. 734,114

17 Claims. (Cl. 74—665)

The present invention relates to a synchronizer for machines, such as glass machines. More particularly, it relates to a mechanism driving two driven members from a single power source and for automatically driving only one of them from another power source when the first power source is rendered inoperative. Stated more particularly, it relates to a mechanism by which a glass forming machine and a glass feeder may be operated concurrently and in proper timed relationship from a power shaft, which mechanism automatically causes the feeder to continue to operate from another power shaft without operation of the forming machine, whenever the latter is stopped. It preferbaly incorporates two separate motors, one of which usually is a large motor, and which drives a shaft that is connected to the glass forming machine and drives another shaft which is connected through the synchronizing mechanism to a feeder operating shaft; and the other of which is a smaller motor capable of driving the feeder shaft alone, which smaller motor drives through the synchronizing mechanism to the feeder shaft. The two drives are connected to the synchronzing shaft through one-way clutches, and the smaller motor drives the synchronizing shaft at a somewhat lower speed than that produced by the larger motor. Hence, when the large motor is operating, it will operate the feeder shaft at a slightly greater speed than that applied by the smaller motor, and the one-way clutch permits the synchronizer shaft to run away from, or out from under, the smaller motor shaft. When the larger motor is stopped, the smaller motor is effective to drive the synchronizer shaft, and in so doing causes the synchronizer shaft to run away from the larger motor shaft through the one-way clutch between them.

It is an object of the invention to provide a composite synchronizing mechanism that may be connected to two separate motors, wherein one motor may normally override the other motor and produce a driving force for a shaft on the output end of the synchronizer, but with one-way clutch mechanism between the larger motor and the synchronizing shaft and similar mechanism between the smaller motor and the synchronizing shaft, so that, when the larger motor operates, the small motor may idle, and, when the larger motor is inoperative, the smaller motor may drive the synchronizer shaft without applying any load to the connections to the larger motor.

It is a further object of the invention to provide adjusting means for properly synchronizing the output shaft of the synchronizer with the driving mechanisms, and particularly for making the adjustment while the machines are operating. It is a further object of the invention to provide means for adjusting the speeds of the two motors in this combination individually, to obtain variable speeds for the glass machines, and to obtain proper coordination of the large and small motors.

Particular objects include the details of the means for adjusting the synchronizer and details of the interconnections of the parts by which the foregoing main objects are accomplished. An especial object is the provision of a mechanism of this kind that is not only flexible in its operation, but also is rugged in all of its details.

This case is related to the application of Harold A. Youkers, Serial No. 711,948, filed November 23, 1946. The present application is directed to particular structure embodying the broader invention of the Youker's application.

In the drawings:

Fig. 26 is a diagrammatical illustration of the synchronizing mechanism in association with a glass machine and feeder timer.

Figures 1, 2B:
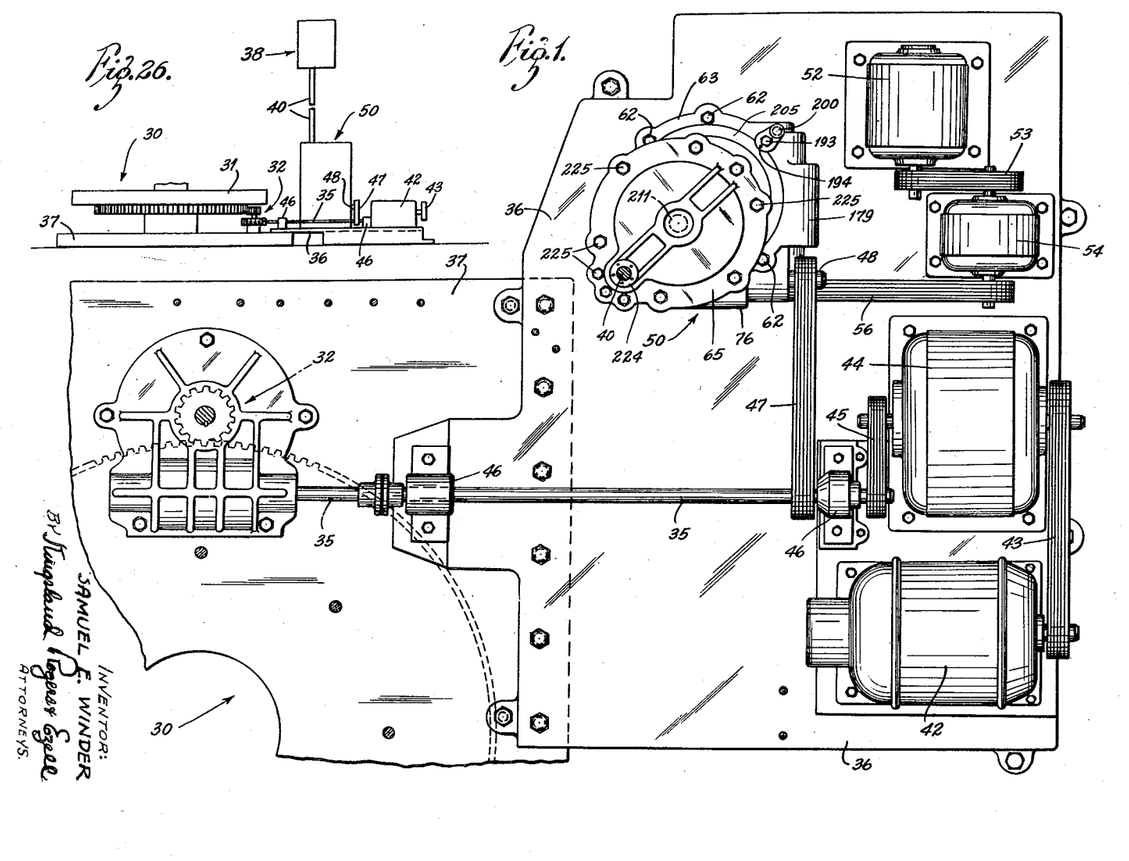
Fig. 1 is a plan view showing the disposition of the several elements of the mechanism in combination with parts of a glassware molding machine and feeder shown diagrammatically.

Referring to Figs. 1 and 26, there is shown a glass forming machine generally indicated at 30. It may be, for example, one like that disclosed in the application of Samuel E. Winder, Serial No. 688,470, filed August 5, 1946, for Bottle Forming Machine. It has a table 31 that rotates about a center shaft and is driven by gearing 32 operated from a shaft 35. A plurality of glassware molds are spaced equally around the periphery of the table 31 and are successively introduced beneath a place where charges of glass are emitted by a glass feeder and severed by shears. A horizontal plate 36, bolted to the base 37 of the forming machine and to the floor, affords a supporting base for the synchronizing mechanism.

The feeder is usually operated by compressed air or other power means, and may conventionally comprise a plunger reciprocating over an orifice, and shears for cutting off the gob or charge of glass that is ejected from the orifice. The operation of the plunger and the operation of the shears are synchronized as through a feeder timer, generally designated at 38. There is a shaft 40 that operates the feeder timer. This construction is conventional and will be understood. The relative arrangement is shown schematically in Fig. 26.

The drive to the two shafts 35 and 40 is obtained by the present mechanism. To this end, there is a large motor 42 that is capable of driving the forming machine through the shaft 35 and the feeder mechanism through the shaft 40. This large motor is connected by a belt 43 into a P. I. V. or a speed varying device 44. The P. I. V. 44 is connected by a belt 45 to the shaft 35, which may be provided with bearings 46.

The shaft 35 is connected by a belt 47 to a shaft 48 which connects into the synchronizer that is generally indicated at 50.

There is another smaller motor 52 that is capable of driving the feeder timer, but need not be large enough to drive the shaft 35. In view of the reduced power required for the secondary operation performed by this small motor, it is preferable to employ it rather than to operate both power shafts from the big motor 42, with means to declutch the shaft 35. The small motor 52 is connected by a belt 53 to the shaft of a smaller P. I. V. or speed varying mechanism 54. The mechanism 54 is connected by a belt 56 to a shaft 58 that likewise leads into the synchronizer 50.

It may be seen that, when the motor 42 is operating, the shaft 35 will be driven to operate the forming machine. Likewise, the shaft 48 will be driven to apply power into the synchronizer 50. The small motor 52 is not connected with the shaft 35, but does drive into the synchronizer 50. While the shafts 48 and 58 are driven shafts with respect to the motors, they are driving or power shafts with respect to the synchronizer 50.

Figures 2, 3, 4, 5, 6, 7, 8:
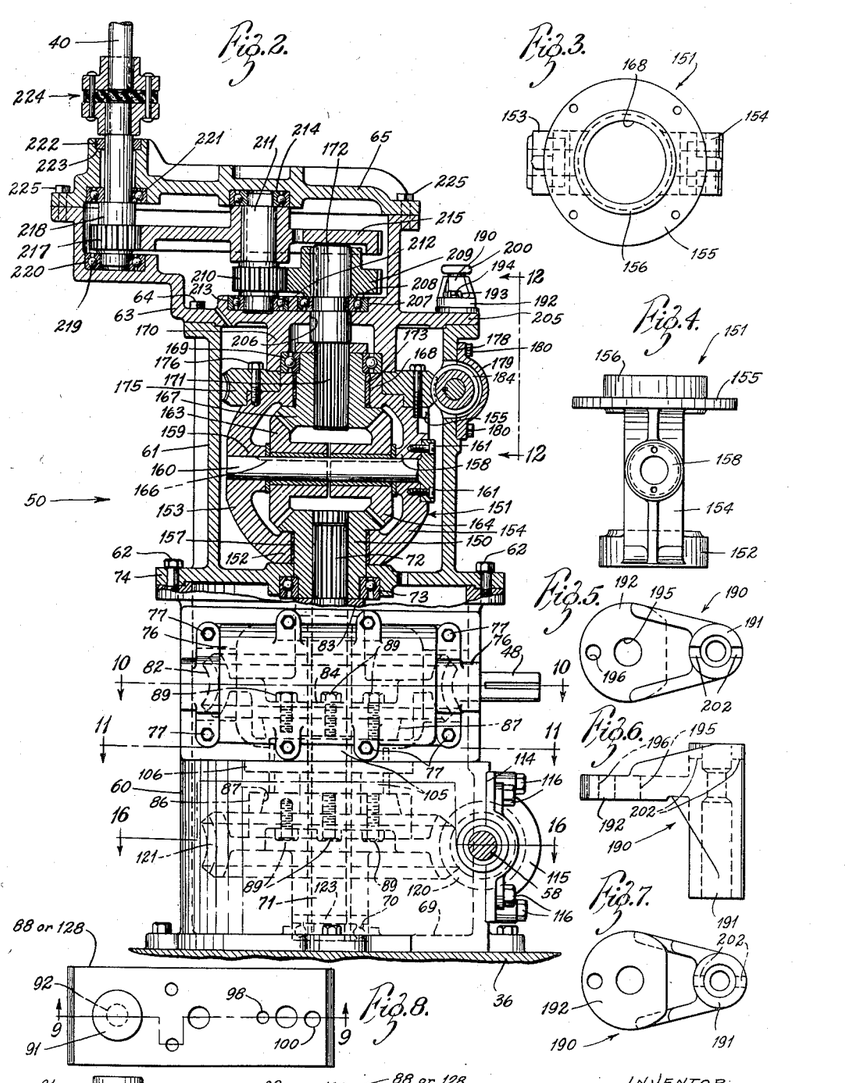
Fig. 2 is an elevation partly in medial section of the synchronizer unit.
Fig. 3 is a plan view of the adjustment cage of the synchronizer.
Fig. 4 is a side elevation of the cage shown in Fig. 3.
Fig. 5 is a plan view of a bracket used in the adjustment mechanism.
Fig. 6 is a side elevation of the bracket of Fig. 5.
Fig. 7 is a bottom view of the bracket of Fig. 5.
Fig. 8 is a plan view of one of the ratchet holding plates.

Referring particularly to Fig. 2, the synchronizer includes a lower housing 60, mounted upon the base 36, an intermediate housing 61 that is bolted at 62 to the top of the lower housing. Above the upper housing, there is a top housing 63 that is bolted at 64 to the top of the intermediate housing 61. The top housing 63 is enclosed by a cap 65 that is bolted to the top thereof.

Reference to the drawings will show that these several housings interfit by being provided with rabbets that engage in grooves, so that the parts are automatically positioned and held against movement. They thus may be assembled one on top of the other and finally fastened securely into position by the various screws. This simplifies the assembly. The bottom housing 60 has a rear opening 66 enclosed by a cover 67 attached by screws 68. This closure 67 may be removed to give access to the ratchet mechanisms, as will appear. The assembled synchronizer housing is secured to the base 36 by a series of bolts, as shown, or otherwise.

Figure 17:
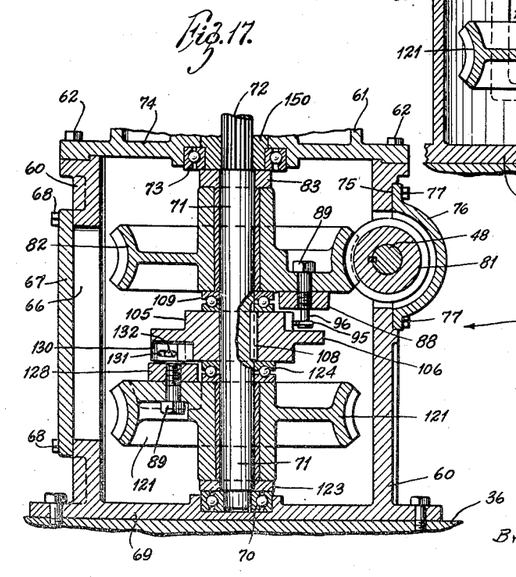
Fig. 17 is a vertical medial section through the lower part of Fig. 2, taken on the line 17—17 thereof and on the line 17—17 of Fig. 10.
Figure 18:
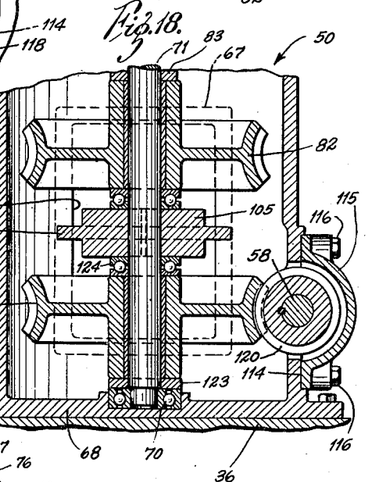
Fig. 18 is a section through the lower part of the synchronizer taken on the line 18—18 of Fig. 10.

The bottom housing 60 has a bottom plate 69 therein, as shown in Figs. 17 and 18, in which bottom plate a bearing 70 is mounted. This bearing supports the lower end of a synchronizer input shaft 71 that extends medially upwardly through the lower casing 60. This shaft has a splined upper section 72 that is ultimately supported in a bearing 73 located in the center of a lower partition 74 in the bottom of the intermediate housing 61. The two motor or power shafts 48 and 58 are connected to drive the shaft 71, and the shaft 71 is a driven shaft with respect to the power shafts 48 and 58, as well as an input shaft with respect to the mechanism above it.

Figures 10, 11, 13, 14, 15:
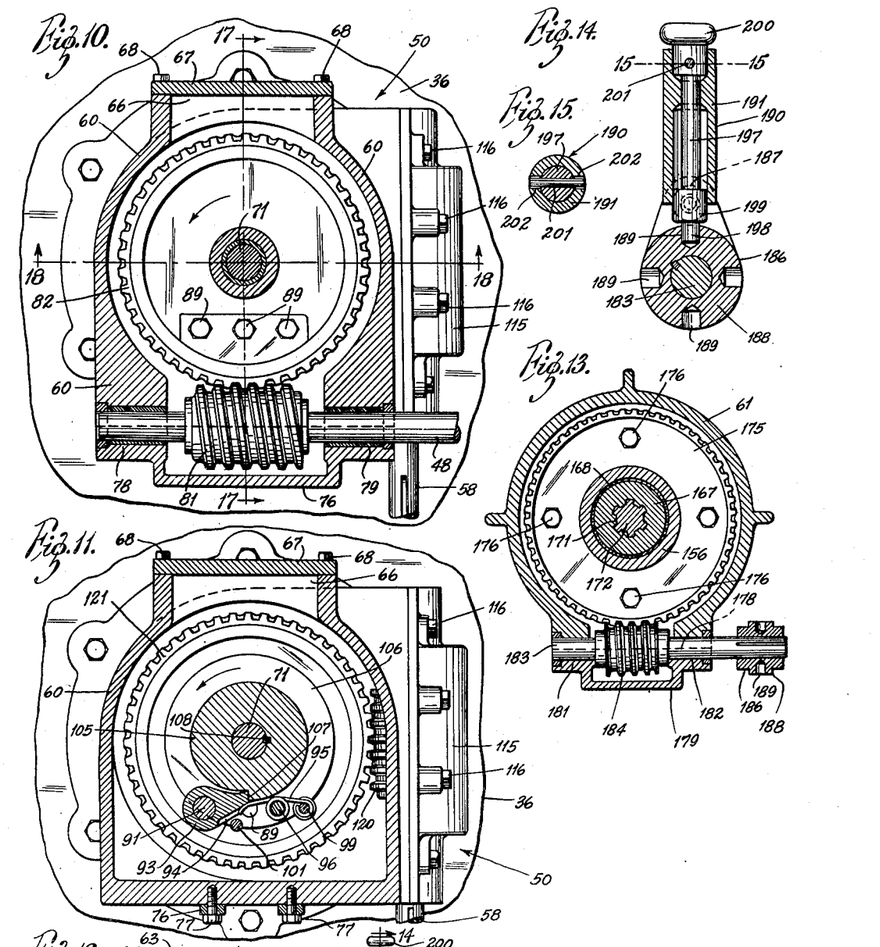
Fig. 10 is a horizontal section, taken on the line 10—10 of Fig. 2 and showing the connection with the synchronizer of the main power shaft driven by the large motor.
Fig. 11 is a section on the line 11—11 of Fig. 2, showing the ratchet or one-way clutch mechanism of the main power shaft to the synchronizer.
Fig. 13 is a horizontal section through the adjusting mechanism, taken on the line 13—13 of Fig. 12.
Fig. 14 is a vertical section through a part of the adjusting mechanism, taken on the line 14—14 of Fig. 12.
Fig. 15 is a horizontal section on the line 15—15 of Fig. 14.
Figure 12:
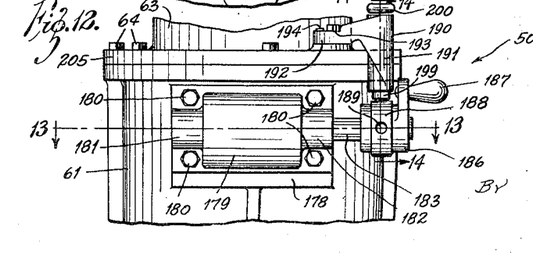
Fig. 12 is a side view of the adjusting mechanism, taken approximately on the line 12—12 at the upper right of Fig. 2.
Figure 21:
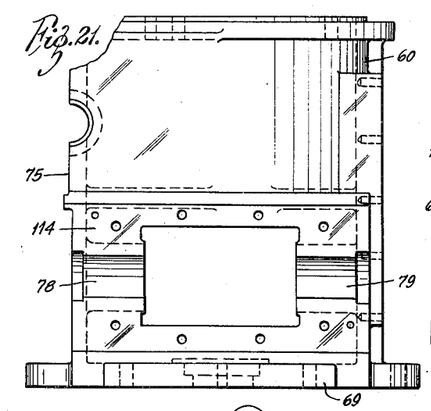
Fig. 21 is an elevation taken from the right of Fig. 2 of the lower housing section.

As shown in Fig. 21, the bottom housing 60 has a flat portion 75 across its upper part at the front of Fig. 2. This flat part 75 is adapted to receive a cap 76 that closes it and forms with it a worm gear casing and a journal casing for the shaft 48. The cap 76 is bolted at 77 to the front panel 75. As shown in Fig. 10, the surface 75 extends along a diameter of the shaft 48, so that the cap 76 and the adjacent parts of the bottom housing 60 are cut away in complementary half-cylinders to form bearings 78 and 79, which may be properly bushed, as indicated, to support the shaft 48.

Within the casing thus provided, the shaft 48 has on it a worm 81 which is rotated upon rotation of the shaft 48. This worm is intermeshed with a worm gear 82 that is rotatably supported on the shaft 71 by being mounted on a flanged spacer bushing 83 that surrounds the shaft 71.

Figure 9:
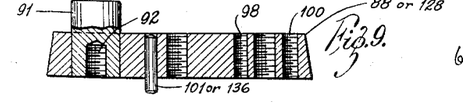
Fig. 9 is a section on the plate of Fig. 8, taken on the line 9—9 thereof.
Figure 19:
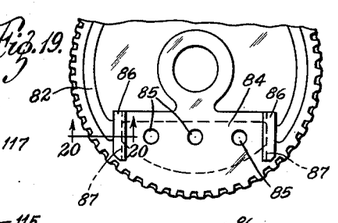
Fig. 19 is a bottom view of one of the upper worm gears and its ratchet plate (which corresponds to a top view of the lower worm gear and its plate)
Figure 20:
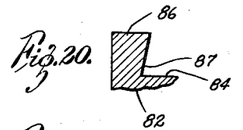
Fig. 20 is a section on the line 20—20 of Fig. 19.

The worm gear 82, as shown particularly in Figs. 17 and 19, has on its bottom surface an integrally formed, finished, plate receiving section 84 provided with three holes 85 that are arranged between two outstanding dovetailed flanges 86, undercut as shown at 87 in Fig. 20. These two flanges 86 are adapted to receive a ratchet dog plate 88, shown in detail in Figs. 8 and 9, and appearing assembled on the bottom surface of one side of the worm gear 82, in Figs. 11 and 17. The plate 88 is attached to the bottom surface of the worm gear 82 by three screws 89 that extend downwardly from the top of the worm gear, as shown in Figs. 10 and 17.

The plate 88 has a ratchet dog pin 91 pressed thereinto concentrically with one of the screw holes 85 in the worm gear. This pin 91 is tapped at 92 to receive one of the screws 89. A ratchet dog 93 is mounted over the pin 91 and may rock thereon. This ratchet dog has a groove 94 along one side edge, in which one end of a torsion spring 95 fits. This spring 95 urges the dog 94 toward the shaft 71, and also tends to prevent the ratchet dog 93 from moving off the pin 91. The spring 95 is wrapped around a spring holder button 96 that is supported on the plate 88 by a screw that engages in a hole 98 in the plate 88. The other end of the spring 95 is wrapped around a screw 99 that fits in another threaded hole 100 of the plate 88. Movement of the ratchet dog away from the shaft 71 is limited by a pin 101 pressed into the plate 88.

The ratchet dog 93 is urged by the spring 95 into engagement with a ratchet disc 105. This ratchet disc has a peripheral flange 106 that is described about the center of the disc. Above the flange 106, there is a shoulder 107 with which the dog 93 may be caused to engage. The extremes of this shoulder 107 are smoothly connected by a continuous curved edge on the upper part of the disc. The disc is mounted on the shaft 71 and is keyed thereto, as shown at 108. There is a bearing 109 between the gear 82 and the disc 105.

From the foregoing, it may be seen that, when the worm 81 drives the worm gear 82 in a counterclockwise direction, as viewed in Figs. 10 and 11, the ratchet dog 93 will cause the disc 105 to rotate in a counterclockwise direction, and such rotation will be imparted to the shaft 71.

Figure 16:
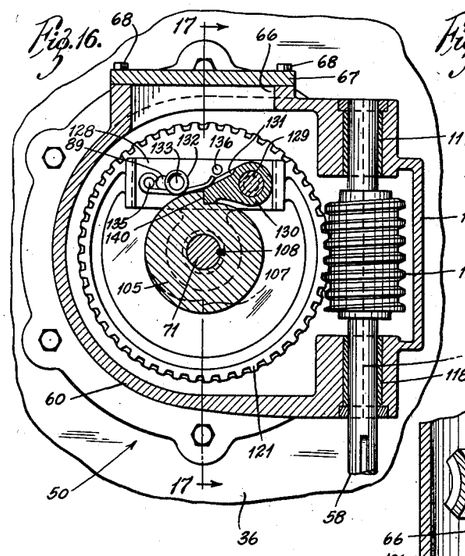
Fig. 16 is a horizontal section on the line 16—16 of Fig. 2 and showing the connection with the synchronizer of the secondary power shaft driven by the smaller motor.

The small motor shaft 58 connects to the shaft 71 in a similar manner. As shown in Fig. 21, the bottom housing 60 is provided with a flat section 114 that is similar to the flat section 75. Over it, a cap 115 fits. This cap is identical with the previously described cap 76. It is attached to the surface 114 by screws 116. As shown in Fig. 16, this cap and the associated parts of the bottom section 60 afford a worm wheel housing and are cut out in a complementary manner to receive and journal the shaft 58, there being suitable bushings 117 and 118 for this purpose.

The shaft 58 carries a worm wheel 120 that intermeshes with a lower worm gear 121 that is rotatably mounted on the shaft 71, a spacer bushing 122 being provided for this purpose. Below the end of the hub of the gear 121, there is a spacer 123 that separates the gear from the bearing 70. A bearing 124 is interposed between the disc 105 and the upper end of the gear hub. It will be seen that the several parts mounted on the shaft 71 are supported between the bottom 68 of the bottom housing 60 and the bottom partition 74 of the intermediate housing 61.

The gear 121 is identical with the gear 82, but reference to the drawings, such as Fig. 17, will show that it is turned upside down with respect to the other worm gear. It supports a plate 128 that is identical with the plate 88 and is identically mounted, though on an upper side. This lower plate 128 has a pin 129 in its upper surface, upon which a ratchet dog 130 may rock. This ratchet dog is identical with the ratchet dog 93, and has a groove 131 therein in which one end of a torsion spring 132 fits. This torsion is mounted on a spring button 133 held to the plate 128 by a screw. The other end of the torsion spring 132 is engaged around a screw 135. A limiting pin 136 is provided for the dog 130.

Reference to Fig. 17 will show that the flange 106 of the ratchet disc 105 extends between the pins 91 and 129, upon which the two ratchet dogs 93 and 130 are mounted. Hence these dogs cannot come off.

The ratchet dog 130 is adapted to interengage with a lower shoulder 140 on the disc 105. This shoulder 140 is located diametrically opposite the shoulder 107.

It will be seen that, when the worm gear 120 is rotated to move the worm gear 121 counterclockwise, the ratchet dog 130 will engage with the shoulder 140 and will move the shaft 71 in the same direction.

The upper splined end 72 of the shaft 71 engages with a complementarily splined miter gear 150, which gear is rotatable in the bearing 73 and is supported in the manner shown. Around the hub of the miter gear 150, there is a cage 151 that extends upwardly in the intermediate housing 61. This cage is shown in Figs. 3 and 4 to include a bottom annular portion 152, two side portions 153 and 154, and a top flanged portion 155. This upper portion includes an extension 156 above the flange 155.

The lower annular portion 152 is provided with a central opening, bushed at 157, through which the hub of the miter gear 150 passes. The two side arms 153 and 154 are provided with bearing portions 158 and 159 that receive a shaft 160. This shaft has a head at its right end in Fig. 2, by means of which screws 161 may attach the shaft to the cage 151.

The shaft has a suitable bushing between the side arms 153 and 154, which bushing receives a pair of facing miter gears 163 and 164 which are rotatably mounted on the shaft. The miter gear shaft is provided with an oil groove 166.

The two miter gears 163 and 164 mesh with a top or driven miter gear 167. This gear is caused to pass through a top opening 168 in the cage 151 and to interfit with a bearing 169 mounted in a depending circular flange 170 extending downwardly from the top housing element 63. This miter gear 167 is splined to an end 171 of a shaft 172 that extends upwardly through the partition across the bottom of the top housing 63 and into that housing. A bushing 173 supports the top of the cage 151 about the hub of the top miter gear 167.

From the foregoing, it may be seen that rotation of the splined end 72 of the shaft 71 will cause rotation of the miter gear 150. This, in turn, will rotate the two miter gears 163 and 164 about the shaft 160, and they will rotate the top miter gear 167 and the splined end 171 of the shaft 172.

An adjustment is provided to adjust the relative angular positions of the shafts 71 and 172. This adjustment is effected by rotating the adjustment cage 151 that carries the two gears 163 and 164 about the centers of the two shafts 71 and 172.

Figure 22:
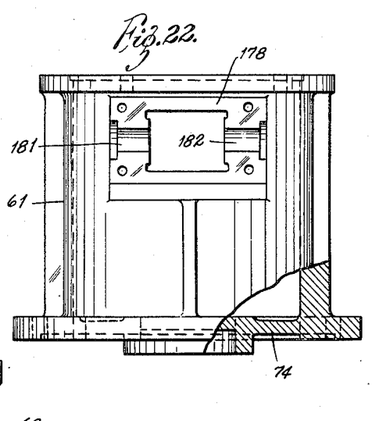
Fig. 22 is an elevation taken from the right of Fig. 2 of the intermediate housing section.

To this end, the cage, at its upper end and on the flange 155, carries a worm gear 175 that is bolted to the two side arms by screws 176, and which bears against the depending end of the flange 170 on the upper housing section 63. The upper part of the intermediate housing section 61 is provided with a flat portion 178 (Fig. 22), over which a cap 179 fits, the cap being secured by screws 180. This cap, together with the adjacent part of the intermediate housing 61, forms a worm wheel housing and is provided with complementary semi-cylindrical cut-outs to provide journals 181 and 182 for an adjustment shaft 183. This shaft 183 carries an adjusting worm 184 that intermeshes with a worm gear 175.

The shaft 183 extends outwardly from the cap 179 and has on its outer end a crank 186, to which a crank handle 187 is attached. This crank 186 has a central hub 188 having a plurality of holes 189 drilled down into the periphery thereof.

A locking pin bracket 190 is provided with a sleeve portion 191 and a horizontal extension 192, which latter fits onto a finished flat boss on the top of the bottom plate of the top housing 63, to which it is attached by a screw 193 and held against rotation by a pin 194. The screw passes through an opening 195 of the extension 192, and the pin passes through an opening 196 in this extension, entering similarly spaced threaded openings in the said boss.

A locking pin 197 passes through the sleeve section 191. It has a lower portion 198 that is adapted to interfit into any of the holes 189, thereby to hold the crank 186 against rotation. There is an enlargement 199 just above the portion 198, which provides for a lower bearing in the sleeve 191. The upper end of the pin 197 passes through another bearing portion, as shown in Fig. 14, and has a handle knob 200 at its upper end. By means of this handle, the pin 197 may be raised out of any hole 189 into which it is engaged.

From the foregoing, it may be seen that, if the knob 200 is lifted, the crank handle 187 may be operated to turn the shaft 183. This rotates the worm wheel 184 and moves the worm gear 175 about the shaft centers. As this worm gear 175 is attached to the cage 151, the latter will be rotated. The cage is rotatable with respect to both of the miter gears 150 and 167, but rotation of the cage causes the shaft 160 to be rotated or turned end over end, varying the two miter gears 163 and 164 to ultimately adjust the shaft 172 with respect to the shaft 71. The knob 200 is provided with a cross pin 201 to engage in slots 202 in the member 190.

Figures 23, 24, 25:
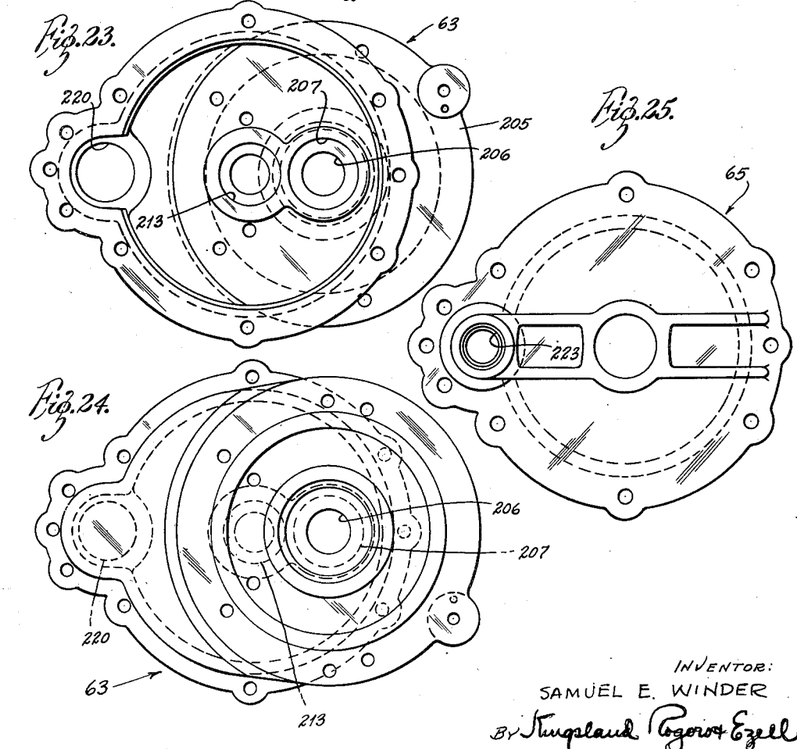
Fig. 23 is a plan view of the upper housing section.
Fig. 24 is a bottom view of the upper housing section.
Fig. 25 is a plan view of the housing cap.

As noted, the shaft 172 projects up into the top housing member 63. The shape of this housing member is indicated in Figs. 2, 23 and 25. Fig. 23 is a top view of the top housing 63 and shows that this housing is made up of a bottom plate 205 that is circular and may fit over the top of the intermediate housing 61, to which it may be held by the screws 64. The shaft 172 is adapted to project through an opening 206 concentric with this partition or bottom plate 205. There is a groove 207 around the opening 206 to receive a bearing 208 for the shaft 172. Above the bearing 208, there is a spur gear 209 that is keyed to the shaft 172. This spur gear intermeshes with a gear 210 on a stud shaft 211. The stud shaft is mounted in a bearing 212 that is supported in a bearing recess 213. It is also borne by a bearing 214 in the cap member 65.

The stud shaft 211 receives a gear 215 of considerably larger size. This gear 215 meshes with a gear 217 on a shaft 218 that is supported in a bearing 219 mounted in a bearing recess 220 in the top housing member 63. The shaft 218 is likewise mounted in a bearing 221 supported in a bearing recess in the cap member 65. The shaft passes through a garlock closure, or the like, 222, supported in an opening 223 in the cap member. A suitable coupling 224 may connect the shaft 218 with the shaft 40.

*Operation*

The motor 42 drives the shaft 48 at a speed slightly in excess of the speed given to the shaft 58 by the smaller motor 52. It is preferable to provide such speed differential, to enable the main motor 42 to carry the load of the shaft 40, and thereby insure absolute synchronism of the shaft 40 and the shaft 35. If the motor 52 drives the shaft 58 at a speed to turn the shaft 72 at a speed greater than the speed imparted thereto by the shaft 48, the exact synchronism may be lost. If the two power shafts operate the shaft 72 at exactly the same speed, synchronism is obtained, but, for obvious practical reasons, this condition is hard to obtain and maintain. Hence it is best to operate the smaller motor at a speed to drive the shaft 72 somewhat slower than the speed produced by the main motor 42. Furthermore, when the motor 52 alone is operating, the forming machine is inoperative and the feeder is operating only to keep the glass from freezing in the forehearth and orifice. It is normally unnecessary to operate the feeder at its full speed to prevent freezing.

When the motor 42 is put in operation, it will drive through the variable speed reducer 44 to operate the shaft 35 and thereby cause the glass forming machine to function. At the same time, the belt 47 will cause the shaft 48 to rotate. The shaft 48 will rotate the worm 81 and cause rotation of the worm gear 82, which is capable of turning on the shaft 71. However, the ratchet dog 93 is mounted on the worm gear 82, so that the dog 93 may be brought against the shoulder 107 on the ratchet disc 105. This will cause the disc 105 to be rotated, it becoming a power take-off element to the ratchet dog 93 and the gear 82. The disc 105 is geared to the shaft 71. Hence, that shaft rotates. The shaft 71, being splined to the lower miter gear 150, causes that gear to rotate. Such will rotate the two miter gears 163 and 164 about their centers on the shaft 160, and this movement, in turn, will cause rotation of the top miter gear 167, which is splined to the shaft 172. Consequently, the shaft 172 rotates. It, in turn, is keyed to the spur gear 209, which meshes with the gear 210 on the stud shaft 211. The stud shaft is keyed to the big gear 215 which is caused to rotate. This gear meshes with the gear 217 on the shaft 218. This shaft thereby rotates and causes the feeder shaft to rotate.

Thus, when the large motor 42 operates, it causes the forming machine shaft 35 to operate to drive the forming machine and, at the same time, it causes the shaft 40 to rotate at a properly related speed to cause the feeder timer to move. As a result, the forming machine may, in typical conventional mechanisms, introduce molds successively to the feeding point below the feeder. At the same time, the feeder plunger or confined air column is actuated to eject the charge of glass to the orifice above the mold, and, when a proper charge has been thus ejected, the feeder shears are caused to sever the same so that it may fall into the waiting mold. The feeder timer 38, typified in Fig. 26, is the mechanism used to cause the feeder and shears to operate. It frequently consists of a cam shaft operating a plurality of air valves in a fixed timed relationship.

It is highly desirable that the feeder continue to operate, even when the molding or forming machine is stopped. In the present mechanism, if the motor 42 is stopped, the motor 52 will continue to run and rotate the shaft 58 at a speed below the speed that the shaft 48 had when it was operating. The shaft 58 drives the worm 120, which meshes with the worm gear 121 and causes it to rotate about the shaft 71. However, the ratchet dog 130 is urged by its spring 132 into engagement with the lower part of the ratchet disc 105. It may therefore be brought into engagement with the lower shoulder 140 on the ratchet disc to cause this disc to operate. This rotation is transmitted to the output shaft 40 in the same manner as previously described in connection with the drive from the larger motor 42.

When the larger motor is operating through the synchronizer and rotating the shaft 48, the upper worm gear 82 will be driven. If the lower worm gear 121 is simultaneously being driven from the shaft 58 and the smaller motor 52 at a lower speed than the upper worm gear 82 is turning, the upper gear and its ratchet dog 93 will be driving the ratchet disc 105 at a higher speed than the speed of the lower ratchet dog 130 imparted by the gear wheel 121. Consequently, the disc 105 will rotate relatively to the gear 121. The peripheral edges of the disc 105 that are engaged by the two dogs 93 and 130 are smooth, save for the shoulders, and the disc 105 will merely move its lower peripheral edge out from under the lower ratchet dog 130.

If, however, the drive is solely by the lower gear 121, the upper gear wheel 82 will not be rotated at all by its motor 42. When this occurs, the disc 105 is driven by the lower ratchet dog 130, while the upper ratchet dog 93 is stationary. This action is permitted because the upper part of the disc 105 and the upper shoulder 107 can merely rotate out from under the upper ratchet dog 93.

It is necessary that the feeder be caused to operate in a strict timed relationship with the forming machine. The belt drives and the gear reductions in the synchronizer are provided to give the shaft 40 the proper number of rotations relative to the number of rotations of the shaft 35; but this relationship does not insure that the charge of glass will be delivered and severed at the precise time when a mold is in position to receive it. In other words, although the interval between successive charges of glass may be exactly the same as the interval between the introduction of successive molds to the feeder, these two cycles may be offset so that the charge of glass is not properly introduced when the mold is in its receiving position.

This phase relationship may be made proper by the adjustment feature of the present synchronizer.

To make such adjustment, the knob 200 is lifted and the crank handle 187 is rotated. This turns the adjusting worm 184 and the adjusting worm gear 175 that is mounted upon the adjustment cage 151. It causes the shaft 160 to be rotated about a vertical axis coincidental with the axes of the two shafts 71 and 172. Assuming that the lower miter gear 150 is stationary during such adjustment, the movement of the adjusting worm 184 in one direction or the other will rock the cage 151 in one direction or the other, as the case may be. Such rotation will cause the two miter gears 163 and 164 to roll over the lower miter gear 150, without changing the position of this gear 150. However, the top miter gear 167 will be caused to rotate, thus producing a relative adjustment between the positions of the two shafts 71 and 172. This adjustment may be made while the machine is in operation, which is a highly desirable feature in the proper timing of glass machinery operations. The adjustment during operation is made possible by the type of mechanism employed. When the adjustment is completed, the knob 200 is depressed to engage the pin end 198 in the nearest hole 189. Ordinarily, these holes 189 may be disposed at 90° and such will be sufficiently accurate for all practical purposes in connection with the use of this machine.

When the large motor 42 is stopped, and the feeder shaft is operated by the small motor 52, the synchronism of the two shafts 35 and 40 is lost. However, as soon as the large motor 42 is restarted, it drives the shaft 35, and is caused to pick up the shaft 40 by engagement again of its ratchet dog 93 with the shoulder 107 on the disc 105. There is only one position of the gear 82 and shaft 72 at which this pick-up can occur, so that re-synchronization of the two shafts automatically occurs. This re-synchronization is facilitated by having a considerable speed differential between the operations produced through the two motors 42 and 52, so that the dog 93 may catch the shoulder 107 with reasonable promptness, despite rotation of the disc 105 by the smaller motor.

The adjusting mechanism is preferably located on the feeder shaft, because it carries the lighter load, and also because it enables the adjustment mechanism to be combined with the ratchet devices.

The individual speeds of the two shafts 35 and 40 are adjustable by regulating the speed changers 44 and 54. Adjustment of the speed changer 44 will vary the over-all speeds of both forming machine and feeder. The idling speed of the feeder may be regulated by the speed changer 54. This, as noted, may be used to insure proper speed relationship between the two ratchet drives.

All of the parts of the machine are readily accessible for repair or replacement. The caps 76 and 115 may be easily removed, and when removed they give access to the worm wheel and its journals and to the gear and ratchet mechanisms associated therewith. As shown, the back plate 67 may be removed from the lower housing section 60 to give access to both of the worm gears and to the interposed ratchet mechanisms. The adjustment bearing cap 179 may be easily removed to give access to these parts.

The ratchet drive is made in a particularly strong manner, in that the tangential force applied from each of the two worm gears 82 and 121 is transmitted through the flanges that support the two plates 88 and 128, as well as through the screws. This relieves the stress upon the screws and permits them to act largely as holding means to retain the plates between their flanges. However, this use of the plates 88 and 128 provides a convenient means for the ready repair of the ratchet parts.

The various housing portions may be easily separated. For example, if the screws 225 are removed, the cap 65 can be withdrawn and the parts located within the top housing 63 may be worked upon conveniently. If the screws 64 are removed, the mechanism enclosed within the top section may be lifted off of the upwardly projecting shaft 172. If it is desired to repair the worm gear drives, the screws 62 may be removed and the whole assembly from the intermediate housing 61 on up may be lifted off because of the spline between the shaft 72 and the gear 150. It is fairly evident that the parts in the lower housing may be easily removed.

It will be seen that the foregoing mechanism provides a rugged and dependable combination that attains the objects hereinbefore appearing.

What is claimed is:

1. A drive mechanism including housing means having a first housing member, a driven shaft rotatably supported in the first housing member, a pair of gears rotatably supported on the shaft, a ratchet disc fixed to the shaft between the gears, a ratchet dog mounted removably on each gear, said dogs being separately engageable with the ratchet disc to drive the same in one common direction only, a pair of cover plates on the first housing, driving means for each gear, said means being enclosed by said cover plates, a second housing on the first housing attached thereto in a direction axially of the driven shaft, a miter gear in the second housing and operated by the driven shaft, a cage mounted in the second housing for rotation about the miter gear axis, a pair of idler miter gears supported on an axis across the cage and meshing with the first miter gear, an output miter gear supported opposite the first miter gear and coaxially therewith, and meshing with the idler gears, a toothed member attached to the cage, a worm meshed therewith, a rotating member for moving the worm, and supported on the second housing, a third housing on the second housing, gearing therein operated by the output miter gear, and output shaft driven by said gearing and supported in the third housing.

2. In a synchronizer for glass machinery, a first and a second power shaft, a driven shaft, a first gear coaxial with the driven shaft and connected for rotation by the first power shaft, a second gear coaxial with the driven shaft and connected for rotation by the second power shaft, one-way clutch means between each gear and the driven shaft for operating the driven shaft when either gear is rotating, said one-way clutch means including a ratchet wheel connected to the driven shaft between the gears, ratchet mechanisms between the wheel and each gear, the ratchet mechanisms comprising removable plates, means attaching a plate to each gear, and a ratchet dog rockably mounted on each plate.

3. In a synchronizer for glass machinery, a driven shaft, a pair of gears mounted for rotation on the shaft, means for rotating each gear, one-way ratchet means connecting each gear with the driven shaft whereby rotation of either gear will rotate the shaft, a bevel gear on said driven shaft, a cage rotatably mounted coaxially with the shaft, transverse shaft means on the cage, a bevel gear on the transverse shaft means, a take-off bevel gear and take-off shaft therefor, mounted coaxially with the driven shaft, the take-off gear meshing with the transverse gear, and means for rotating the cage, to adjust the position of the driven shaft relatively to the take-off shaft.

4. In a synchronizer for glass machinery, a support, a vertical shaft in the support, a lower gear rotatably mounted on the shaft and supported underneath, a ratchet wheel fixed to the shaft above the lower gear and having a bearing supporting it on the lower gear, an upper gear above the ratchet wheel and having a bearing supporting it on the ratchet wheel, one-way drive means between the lower gear and the ratchet wheel, one-way drive means between the upper gear and the ratchet wheel, a first power element for driving the lower gear, and a second power element for driving the upper gear.

5. In a synchronizer for glass machinery, a support, a vertical shaft in the support, a lower gear rotatably mounted on the shaft and supported underneath, a ratchet wheel fixed to the shaft above the lower gear and having a bearing supporting it on the lower gear, an upper gear above the ratchet wheel and having a bearing supporting it on the ratchet wheel, one-way drive means between the lower gear and the ratchet wheel, one-way drive means between the upper gear and the ratchet wheel, a first power element for driving the lower gear, and a second power element for driving the upper gear, the support comprising a housing having bearing means for the vertical shaft, each power element having a rotatable element engageable with its gear, bearing parts in the housing to receive said rotatable elements, cap elements, one to cover each rotatable element and having bearing parts complementary to the bearing parts in the housing, whereby the cap elements may removably secure the rotatable elements to the housing.

6. In a synchronizer for glass machinery, a support, a vertical shaft in the support, a lower gear rotatably mounted on the shaft and supported underneath, a ratchet wheel fixed to the shaft above the lower gear and having a bearing supporting it on the lower gear, an upper gear above the ratchet wheel and having a bearing supporting it on the ratchet wheel, one-way drive means between the lower gear and the ratchet wheel, one-way drive means between the upper gear and the ratchet wheel, a first power element for driving the lower gear, and a second power element for driving the upper gear, the support comprising a housing having bearing means for the vertical shaft, each power element having a rotatable element engageable with its gear, bearing parts in the housing to receive said rotatable elements, cap elements, one to cover each rotatable element and having bearing parts complementary to the bearing parts in the housing, whereby the cap elements may removably secure the rotatable elements to the housing, the rotatable elements comprising worm gears with bearings at opposite ends thereof.

7. A synchronizer for glass machinery or the like, including a pair of power shafts, a shaft to be driven by said power shafts, a pair of gears, one connected with each of the power shafts, and connectible with the driven shaft, ratchet means between at least one gear and the driven shaft, including a block having sliding, interfitting, removable connecting means by which the block is mounted on the gear, a ratchet dog rockably mounted on the block, and a ratchet wheel connected to the driven shaft.

8. A synchronizer for glass machinery or the like, including two power shafts, a pair of operating shafts, means to drive one operating shaft from one power shaft, synchronizer mechanism to connect both power shafts to the other operating shaft, including an intermediate shaft between the other operating shaft and the two power shafts, one-way clutch means between at least one power shaft and the intermediate shaft, and adjusting means between the intermediate shaft and the said other operating shaft, the adjusting means comprising continuously engaged mechanism for transmitting motion from the intermediate shaft to the operating shaft and means to produce relative angular displacement between the intermediate shaft and the said output shaft, about their axes, without disengaging said motion transmitting mechanism.

9. A synchronizer for glass machinery or the like, including two power shafts, a pair of operating shafts, means to drive one operating shaft from one power shaft, synchronizer mechanism to connect both power shafts to the other operating shaft, including an intermediate shaft between the other operating shaft and the two power shafts, one-way clutch means between at least one power shaft and the intermediate shaft, and adjusting means between the intermediate shaft and the said other operating shaft, the adjusting means comprising continuously engaged mechanism for transmitting motion from the intermediate shaft to the operating shaft and means to produce relative angular displacement between the intermediate shaft and the said output shaft, about their axes, without disengaging said motion transmitting mechanism, said one-way clutch means being engageable to drive the intermediate shaft only when its power shaft and the intermediate shaft have predetermined relative angular positions about their respective axes.

10. A synchronizing mechanism for glass machinery and the like, including a pair of power shafts, a pair of operating shafts, means connecting one power shaft to one operating shaft, synchronizing mechanism between the other operating shaft and both power shafts, including a one-way clutch means between the said one power shaft and the said other operating shaft, the said one-way clutch means having interengaging driving means engageable only when the said one power shaft and the said other operating shaft have predetermined angular positions about their axes, whereby when the said other operating shaft is driven by said one power shaft, the two operating shafts will be synchronized by having predetermined angular positions about their axes.

11. A synchronizing mechanism for glass machinery and the like, including a pair of power shafts, a pair of operating shafts, means connecting one power shaft to one operating shaft, synchronizing mechanism between the other operating shaft and both power shafts, including a one-way clutch means between the said one power shaft and the said other operating shaft, the said one-way clutch means having interengaging driving means engageable only when the said one power shaft and the said other operating shaft have predetermined angular positions about their axes, whereby when the said other operating shaft is driven by said one power shaft, the two operating shafts will be synchronized by having predetermined angular positions about their axes, and means to vary the said predetermined angular positions of said two operating shafts.

12. A synchronizing mechanism for glass machinery and the like, including a pair of power shafts, a pair of operating shafts, means connecting one power shaft to one operating shaft, synchronizing mechanism between the other operating shaft and both power shafts, including a one-way clutch means between the said one power shaft and the said other operating shaft, the said one-way clutch means having interengaging driving means engageable only when the said one power shaft and the said other operating shaft have predetermined angular positions about their axes, whereby when the said other operating shaft is driven by said one power shaft, the two operating shafts will be synchronized by having predetermined angular positions about their axes, and additional one-way clutch means between the other power shaft and the other operating shaft.

13. In a synchronizer of the kind described, a lower hollow housing, a vertical driven shaft in the housing, a lower and an upper gear on the shaft in the housing, said gears being freely rotatable on the shaft; a first power shaft, bearing means for supporting the first power shaft on the side of the housing adjacent the lower gear, a driving member on the first power shaft enmeshed with the lower gear; a second power shaft, bearing means for supporting the second power shaft on the side of the housing adjacent the upper gear, a driving member on the second power shaft enmeshed with the upper gear; a take-off element on the shaft and attached thereto between the two gears, and ratchet means between both of the gears and the take-off element to drive the element and the driven shaft, said ratchet means both driving the take-off element in the same direction.

14. In a synchronizer of the kind described, a lower hollow housing, a vertical driven shaft in the housing, a lower and an upper gear on the shaft in the housing, said gears being freely rotatable on the shaft; a first power shaft, bearing means for supporting the first power shaft on the side of the housing adjacent the lower gear, a driving member on the first power shaft enmeshed with the lower gear; a second power shaft, bearing means for supporting the second power shaft on the side of the housing adjacent the upper gear, a driving member on the second power shaft enmeshed with the upper gear; a take-off element on the shaft and attached thereto between the two gears, and ratchet means between both of the gears and the take-off element to drive the element and the driven shaft, said ratchet means both driving the take-off element in the same direction, the ratchet means providing single ratchet tooth engagement between the take-off element and at least one of the gears, whereby the relationship between the driven shaft and such of the gears will remain constant whenever the driven shaft is operated thereby.

15. A drive mechanism including housing means having a first housing member, a driven shaft rotatably supported in the first housing member, a pair of gears rotatably supported on the shaft, a ratchet disc fixed to the shaft between the gears, a ratchet dog mounted removably on each gear, said dogs being separately engageable with the ratchet disc to drive the same in one common direction only, a pair of cover plates on the first housing, driving means for each gear, said means being enclosed by said cover plates, a second housing on the first housing attached thereto in a direction axially of the driven shaft, a miter gear in the second housing and operated by the driven shaft, a cage mounted in the second housing for rotation about the miter gear axis, a pair of idler miter gears supported on an axis across the cage and meshing with the first miter gear, an output miter gear supported opposite the first miter gear and coaxially therewith, and meshing with the idler gears, a toothed member attached to the cage, a worm meshed therewith, a rotating member for moving the worm, and supported on the second housing, a third housing on the second housing, gearing therein operated by the output miter gear, an output shaft driven by said gearing and supported in the third housing.

16. In a synchronizer of the kind described, a lower hollow housing, a vertical driven shaft in the housing, a lower and an upper gear on the shaft in the housing, said gears being freely rotatable on the shaft; a first power shaft, bearing means for supporting the first power shaft on the side of the housing adjacent the lower gear, a driving member on the first power shaft enmeshed with the lower gear; a second power shaft, bearing means for supporting the second power shaft on the side of the housing adjacent the upper gear, a driving member on the second power shaft enmeshed with the upper gear; a take-off element on the shaft and attached thereto between the two gears, and ratchet means between both of the gears and the take-off element to drive the element and the driven shaft, said ratchet means both driving the take-off element in the same direction, and an upper housing mounted on top of the lower housing, the upper housing having mounted therein as a unit, a first and a second gear, the first gear being engageable with the driven shaft and the second gear being connectable with an output shaft, a support between said first and second gear, an intermediate gear on the support and interengageable with the first and second gear, and means mounting the support on the upper housing for arcuate movement about the axis of one of the two (first and second) gears.

17. In a synchronizer of the kind described, a lower hollow housing, a vertical driven shaft in the housing, a lower and an upper gear on the shaft in the housing, said gears being freely rotatable on the shaft; a first power shaft, bearing means for supporting the first power shaft on the side of the housing adjacent the lower gear, a driving member on the first power shaft enmeshed with the lower gear; a second power shaft, bearing means for supporting the second power shaft on the side of the housing adjacent the upper gear, a driving member on the second power shaft enmeshed with the upper gear; a take-off element on the shaft and attached thereto between the two gears, and ratchet means between both of the gears and the take-off element to drive the element and the driven shaft, said ratchet means both driving the take-off element in the same direction, and an upper housing mounted on top of the lower housing, the upper housing having mounted therein as a unit, a first and a second gear, the first gear being engageable with the driven shaft and the second gear being connectable with an output shaft, a support between said first and second gear, an intermediate gear on the support and interengageable with the first and second gear, and means mounting the support on the upper housing for arcuate movement about the axis of one of the two (first and second) gears, and a removable top closure housing on the upper housing, including a gear train, a shaft interconnecting the second gear in the upper housing with the gear train, and a shaft leading from the gear train for connection with a machine to be operated from the synchronizer.

SAMUEL E. WINDER.

REFERENCES CITED

The following references are of record in the file of this patent:

UNITED STATES PATENTS

| Number | Name | Date |
|---|---|---|
| 1,692,589 | Soubier | Nov. 20, 1928 |
| 1,951,875 | Laabs | Mar. 20, 1934 |
| 1,996,579 | Johnstone et al. | Apr. 2, 1935 |
| 2,026,023 | Du Bois | Dec. 31, 1935 |
| 2,105,914 | Fritzsch | Jan. 18, 1938 |
| 2,167,676 | Pechy | Aug. 1, 1939 |
| 2,308,926 | Kreis | Jan. 19, 1943 |
| 2,330,985 | Meyer | Oct. 5, 1943 |